(12) United States Patent
Chiang et al.

(10) Patent No.: US 7,427,953 B2
(45) Date of Patent: Sep. 23, 2008

(54) WIRELESS COMMUNICATION APPARATUS FOR DETERMINING DIRECTION OF ARRIVAL INFORMATION TO FORM A THREE-DIMENSIONAL BEAM USED BY A TRANSCEIVER

(75) Inventors: Bing A. Chiang, Melbourne, FL (US); Steven Jeffrey Goldberg, Downington, PA (US); Michael James Lynch, Merritt Island, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 335 days.

(21) Appl. No.: 11/285,683

(22) Filed: Nov. 22, 2005

(65) Prior Publication Data

US 2006/0114158 A1 Jun. 1, 2006

Related U.S. Application Data

(63) Continuation of application No. 11/025,421, filed on Dec. 29, 2004, now Pat. No. 6,992,622.

(60) Provisional application No. 60/619,223, filed on Oct. 15, 2004.

(51) Int. Cl.
G01S 5/02 (2006.01)
H01Q 3/02 (2006.01)
(52) U.S. Cl. .................. 342/424; 342/373; 342/374; 342/443
(58) Field of Classification Search ......... 342/373–374, 342/424, 442–443, 445
See application file for complete search history.

(56) References Cited

U.S. PATENT DOCUMENTS 4,989,011 A 1/1991 Rosen et al.
5,371,506 A * 12/1994 Yu et al. ................. 342/380

(Continued)

FOREIGN PATENT DOCUMENTS

| TW | 535372 | 6/2003 |
| TW | 584361 | 4/2004 |
| WO | 00/67042 | 11/2000 |

OTHER PUBLICATIONS

Chiang et al., "A Foam Dielectric Matrix-Fed Electronically Despum Circular Array", Antennas And Propagation Society International Symposium, 1970, vol. 8, pp. 29-36, (Sep. 1970).

*Primary Examiner*—Dao L Phan
(74) *Attorney, Agent, or Firm*—Volpe and Koenig, P.C.

(57) ABSTRACT

A wireless communication method and antenna system for determining the direction of arrival (DOA) of received signals in azimuth and elevation, (i.e., in three dimensions), to form a beam for transmitting and receiving signals. The system includes two antenna arrays, each having a plurality of antenna elements, two first stage multi-mode-port matrices, at least one second stage multi-mode-port matrix, an azimuth phase detector, an elevation amplitude detector, a plurality of phase shifters and a transceiver. The antenna arrays and the first stage multi-mode-port matrices form a plurality of orthogonal omni-directional modes. Each of the modes has a characteristic phase set. Two of the modes' phases are used to determine DOA in azimuth. The second stage multi-mode-port matrix forms a sum-mode and a difference-mode used to determine the DOA of the received signals in elevation. A beam is formed in the direction of the received signals by adjusting the phase shifters.

30 Claims, 4 Drawing Sheets

U.S. PATENT DOCUMENTS

| | | |
|---|---|---|
| 5,771,017 A | 6/1998 | Dean et al. |
| 6,127,974 A * | 10/2000 | Kesler ........................ 342/417 |
| 6,304,214 B1 | 10/2001 | Aiken et al. |
| 6,650,910 B1 | 11/2003 | Mazur et al. |
| 6,690,917 B2 | 2/2004 | Soliman et al. |
| 6,791,507 B2 | 9/2004 | Johansson et al. |
| 6,992,622 B1 * | 1/2006 | Chiang et al. ................ 342/374 |
| 2003/0058153 A1 * | 3/2003 | Yu ............................... 342/17 |

* cited by examiner

WIRELESS COMMUNICATION APPARATUS FOR DETERMINING DIRECTION OF ARRIVAL INFORMATION TO FORM A THREE-DIMENSIONAL BEAM USED BY A TRANSCEIVER

CROSS REFERENCE TO RELATED APPLICATION

This application is a continuation of U.S. patent application Ser. No. 11/025,421 filed Dec. 29, 2004, now U.S. Pat. No. 6,992,622, which in turn claims priority from U.S. Provisional Patent Application No. 60/619,223, filed Oct. 15, 2004, which is incorporated by reference as if fully set forth.

FIELD OF INVENTION

The present invention is related to a wireless communication system. More particularly, the present invention is related to determining direction of arrival (DOA) information of received signals in azimuth and elevation, (i.e., in three dimensions), to form a three-dimensional beam used by a transceiver to transmit and receive signals.

BACKGROUND

Beamforming is performed in wireless communication systems to facilitate the enhancement of communications exchanged between communicating entities, and the rejection of signals that interfere with the communications.

Determining the DOA of beams received from the communicating entities is fundamental to correctly orienting a boresight of the beams and, using an appropriate beam width, power, and other settings, and maximizing the performance of one communication link while minimizing interference to other links.

An example of a conventional wireless communication system that determines the DOA is U.S. Pat. No. 6,650,910 entitled "Methods and Apparatus in Antenna Diversity Systems for Estimation of Direction of Arrival", which issued to Mazur et al., (hereinafter referred to as "Mazur"), on Nov. 18, 2003. The system disclosed by Mazur is capable of deducing the DOA in one plane of incidence. However, Mazur's system is capable of determining only the direction of the beam within a two-dimensional plane at a right angle to the antenna array.

An adaptive antenna generates a set of antenna beams such that each beam covers a narrow predefined area and the beams together cover a wide predefined area omni-directionally or within a sector. A signal sent from a transmitter is received by each of the antenna beams, and each signal is processed to calculate the angular information. The angular information is inherent in the phase difference between different versions of the signal. A DOA estimation of the direction to the signal source is made on the basis of the demodulated versions of the received signal.

Conventional wireless communication systems estimate DOA in the context of azimuth only, such as with Butler matrix implementations as disclosed by Mazur. The prior art does not take into account beamforming differing in three-dimensional space. There is no resolution in the elevation domain in conventional wireless communication systems. The beam must therefore be of such a width in elevation that it adequately intersects with the target's antenna pattern.

FIG. 1 illustrates the disadvantages of restricting the formation of beams, formed by a transmitter 100, to two dimensions 105 and 110, (i.e., one plane), in a conventional wireless communication system including the transmitter 100 and a receiver 120 having an antenna 215. Any given plane is defined by two dimensions. For example, a general volume of space is defined by coordinates x, y, and z. A plane may be defined by selecting any two of the coordinates, say x and y. This plane contains all of the possible values of z. The prior art can operate in a plane using any of two of these dimensional pairs, or a plane skewed from the three orthogonal directions. However, there will always be a plane remaining with indeterminate values, which may or may not be parallel to a fixed orientation. Alternatively, the coordinate system could be rotated to make a plane parallel in two of the directions.

When beam adjustments are made to the beams 105 and 110 shown in the azimuth view of FIG. 1, there is no elevation adjustment of the boresight, as demonstrated by the beams 105 and 110 shown as having the same orientation in the elevation view of FIG. 1. Thus, the beam width is wider in the elevation dimension, with a corresponding need for a higher gain factor. This results in an excessive usage of power by the transmitter 100, and more interference to devices not involved in the link.

Assuming that the transmitter 100 and the receiver 120 are transceivers which communicate via a wireless link, when the direction of beam transmission between the transceiver 100 and the transceiver 120 are reversed, (i.e., transceiver 100 is receiving and transceiver 120 is transmitting), beams similar to those shown in FIG. 1 are formed by the transceiver 100 for the reception of signals without allowing for elevation adjustment of the boresight. However, this may cause an excessive number of signals that are not associated with the link to be received.

SUMMARY

The present invention is related to a wireless communication method and antenna system for determining the direction of arrival (DOA) of received signals in azimuth and elevation, (i.e., in three dimensions), to form a beam for transmitting and receiving signals. The system includes (i) two antenna arrays, each having a plurality of antenna elements, (ii) two first stage multi-mode-port matrices in communication with the two antenna arrays, (iii) at least one second stage multi-mode-port matrix, (iv) an azimuth phase detector, (v) an elevation amplitude detector, (vi) a plurality of phase shifters, and (vii) a transceiver. Each first stage multi-mode-port matrix includes a plurality of interconnecting hybrids for processing azimuth beams. The second stage multi-mode-port matrix includes a plurality of interconnecting hybrids for processing elevation beams.

The antenna arrays and the first stage multi-mode-port matrices form a plurality of orthogonal omni-directional modes. Each mode has a characteristic phase set. Two of the modes' phases are used to determine DOA in azimuth. The second stage multi-mode-port matrix forms a sum-mode and a difference-mode such that DOA of the received signals can be determined in elevation, and beams can be formed in the direction of the received signals by adjusting the phase shifters.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

The present invention is applicable to any type of wireless communication systems, including, but not limited to, cellular systems, mobile systems, fixed access systems, ad-hoc/mesh networks or the like. The present invention is applicable to any wireless communication standards including, but not limited to, 1G through 3G cellular systems, IEEE 802.11 wireless local area networks (WLANs), or the like.

Figure 1:
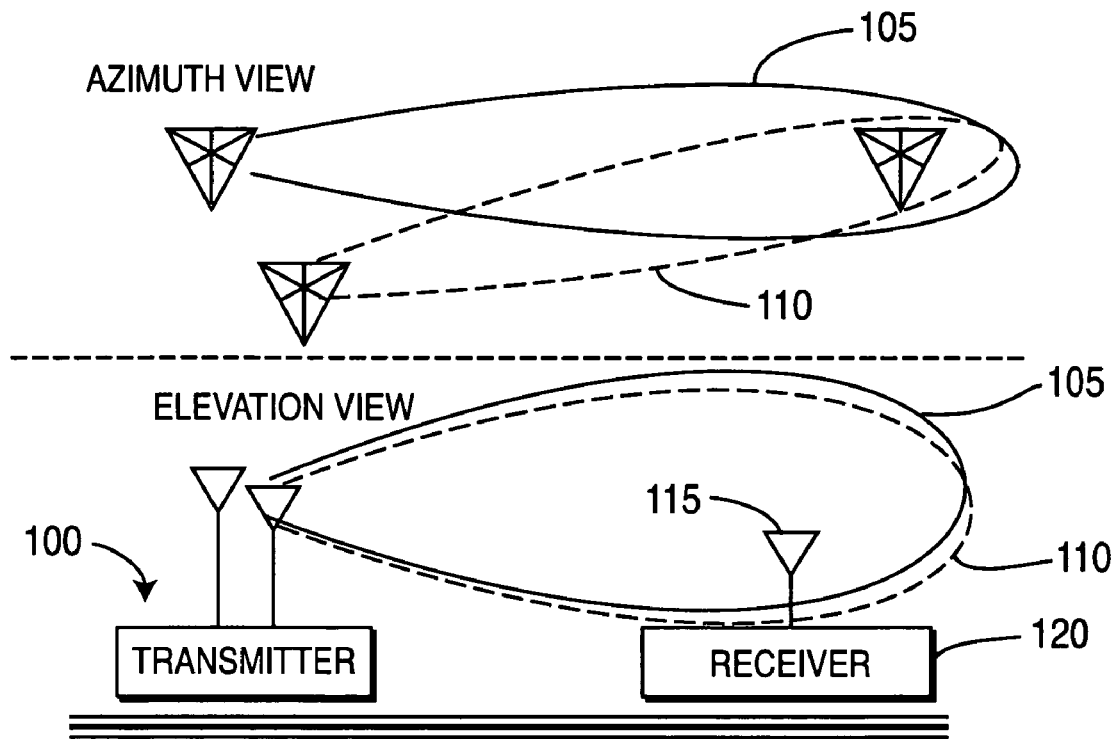
FIG. 1 illustrates the disadvantages of a conventional wireless communication system that restricts beam steering to two dimensions.
Figure 2:
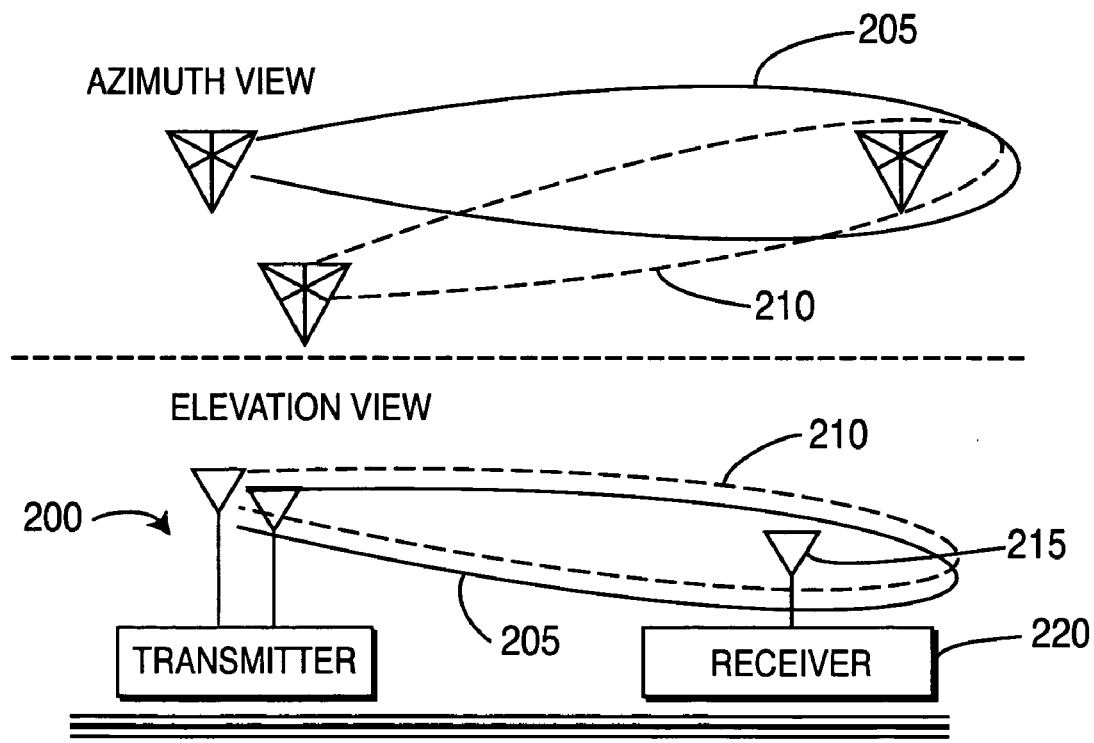
FIG. 2 illustrates the advantages of three-dimensional beamforming in both azimuth and elevation in accordance with the present invention.

FIG. 2 illustrates the advantages of three-dimensional beamforming implemented by a transmitter 200 in both elevation and azimuth, in a conventional wireless communication system including the transmitter 200 and a receiver 220 operating in accordance with one embodiment of the present invention. Contrasting the system of FIG. 2 with the system of FIG. 1, it can be seen that the antenna 215 of the receiver 220 can be encompassed by narrower beams 210 and 205 formed by the transmitter 200, than beams 105 and 110 formed by the transmitter 100. This translates into a lower power requirement for transmitter usage, and less power being sent in other directions causing interference. In the receiver case, the highest gain is focused more directly towards the target, while rejecting signals more effectively from other directions. Note that in order to achieve three-dimensional DOA estimation and beamforming, the Butler Matrix disclosed by Mazur is inadequate.

Using a Shelton-Butler matrix feeding a circular array in an antenna system creates isolated omni-directional pancake beams that are isolated from each other. The phase of each mode is characteristic of the signal's direction of arrival. By comparing the phases of two modes, information of the direction of arrival can be derived. Some mode pair selections allow unambiguous linear relationship between the phase and the DOA. That greatly simplifies subsequent processing.

The same antenna system can electronically and automatically form a beam in the direction of the targeted incoming signal without resorting to a separate system. This system can provide enough gain for wireless applications. For a system that requires higher gain, lenses, reflectors, and electronic controlled parasitic antennas can be used to further increase directivity to meet the need of such applications.

A single array system can be used to perform direction finding and automatic beamforming in the desired direction. This system provides 360 degree instantaneous azimuth coverage, where the prior art cannot.

Figure 3:
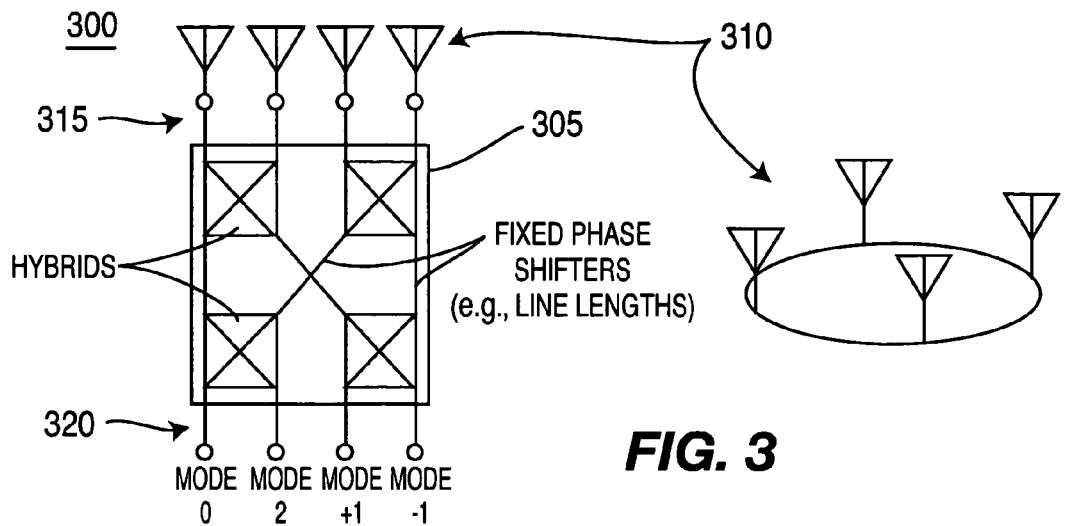
FIG. 3 shows an antenna system including a Shelton-Butler matrix feeding a circular array, thus forming a 4-port Shelton-Butler matrix fed circular array in accordance with one embodiment of the present invention.

FIG. 3 shows an antenna system 300 including a Shelton-Butler matrix 305 feeding a circular antenna array 310, thus forming a 4-port Shelton-Butler matrix fed circular array. Although the circular antenna array 310 is depicted has having four antenna elements, it should be noted that the circular antenna array 310 may have as few as three antenna elements and more than four elements. The ports 315 shown on top connect to the antennas of the circular array 310. The ports 320 on the bottom are mode ports. The Shelton-Butler matrix 305 includes a plurality of hybrids and fixed phase shifters (e.g., line lengths). The antenna system 300 forms multiple but isolated orthogonal omni-directional pancake shaped radiation patterns and thus a plurality of available orthogonal omni-directional modes. The orthogonality preserves the full strength of each mode, which is in contrast to conventional mode formation using a power-divider, where the power is all used up in forming one mode. The phase of the antenna system 300 is linear to the DOA. Linear simplicity and high precision are the products of the antenna system 300, whereby DOA information is provided for in azimuth only.

Elevation DOA detection requires two Shelton-Butler matrices 305 which form two new modes, a sum-mode and a difference-mode. The ratio of the sum-mode over the difference-mode indicates the direction away from boresight.

In order to form a beam in the direction of the arriving signal, a phase shift is inserted in the sum-and-difference matrix to steer the sum-mode beam to the elevation boresight. This sum-mode can be used as the beam for communication. However, the beam shape in azimuth is still omni-directional. To form a directive beam in azimuth, all the modes in azimuth have to be aligned. This requires that each output be divided into two signals, and phase shifting each of the divided signals. The azimuth beam can be synthesized using a fast Fourier transform (FFT). The phase shifting drives the beam to the required direction.

FIGS. 4A-4D show available orthogonal omni-directional modes that are formed by a 4-port Shelton-Butler matrix fed circular array. Each mode has its characteristic phase set. Together, they form a closed set. This set has the same characteristics of a fast Fourier transform set, like they form an orthogonal set, which are completely isolated. The orthogonality preserves the full strength of each mode, which is in contrast to mode formation using a power-divider, where the power is all used up in forming one mode. The multiple modes are labeled 0, +1, −1, and 2, according to the phase progression relative to the azimuth angle ø.

Figure 4A:
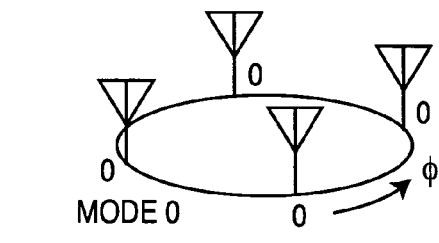
FIGS. 4A-4D show the available orthogonal omni-directional modes that are formed by the circular array of FIG. 3.
Figure 4E:
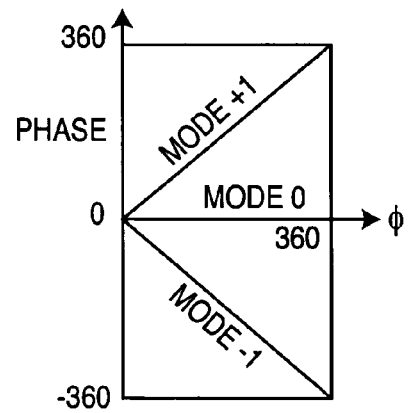
FIG. 4E is a graphical representation of the phase mode 0, mode +1 and mode −1 shown in FIGS. 4A-4C.
Figure 4B:
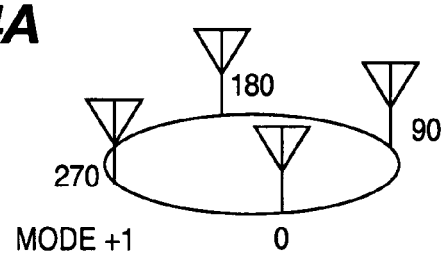
Figure 4C:
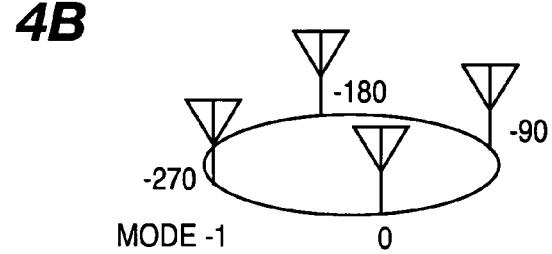
Figure 4D:
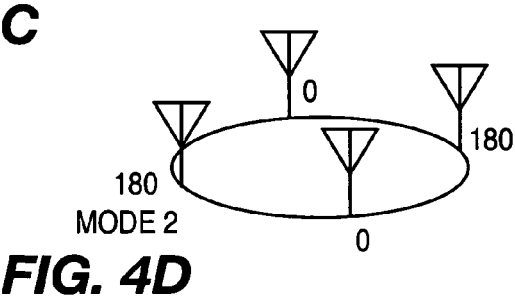

FIG. 4E is a graphical representation of the phase mode 0, mode +1 and mode −1 shown in FIGS. 4A-4C. The mode phases of the first three modes are plotted showing phase versus the angle of arrival ø. FIG. 4E illustrates how the phase is linear to angle ø. If modes +1 and 0 are paired, then the phase difference corresponds directly to the angle of arrival. If modes +1 and −1 are paired, then the phase difference is twice the angle ø. To determine the angle ø, that difference value has to be divided by 2, thus doubling the precision. Linear simplicity and high precision are the products of this system.

Figure 5:
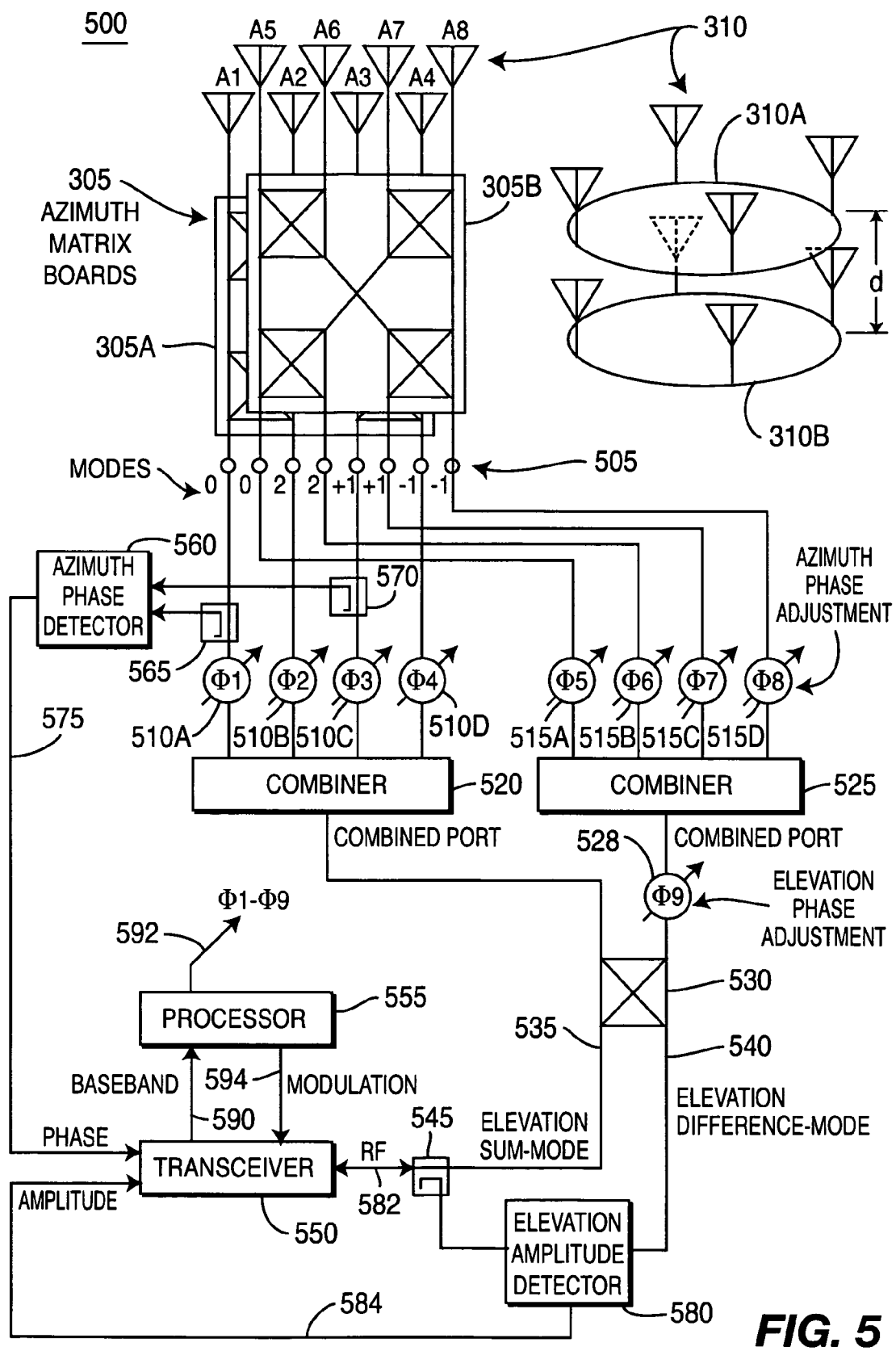
FIG. 5 shows an exemplary antenna system including a 2-tier stacked Shelton-Butler matrix feeding a stacked circular array in accordance with a preferred embodiment of the present invention.

FIG. 5 shows an exemplary antenna system 500 including two azimuth boards 305A and 305B, which feed two identical circular antenna arrays 310A and 310B in accordance with a preferred embodiment of the present invention. The circular antenna arrays 310A and 310B are spaced apart by a distance d. The antenna system 500 forms multiple but isolated orthogonal omni-directional pancake shaped radiation patterns at the mode points 505.

As shown in FIG. 5, the two azimuth boards 305A and 305B form a 2-tier stacked Shelton-Butler matrix which feeds, for example, eight antenna elements A1-A8 of a stacked circular antenna array 310 formed by the two antenna arrays 310A and 310B. The antenna elements A1-A8 of the circular antenna array 310 may be any type with any polarization. The mode ports of the azimuth board 305A are electrically coupled to a plurality of electronic azimuth phase shifters 510A, 510B, 510C and 510D and a combiner 520. The mode ports of the azimuth board 305B are electrically coupled to a plurality of electronic azimuth phase shifters 515A, 515B, 515C and 515D and combiner 525. An electronic elevation phase shifter 528 is coupled to the combined port of the combiner 525. The combined port of the combiner 520 and the output of the electronic elevation phase shifter 528 are connected to respective input ports of a Butler matrix 530. The outputs from the Butler matrix 530 form an elevation sum-mode 535 and an elevation difference-mode 540.

The transceiver 550 provides a baseband signal 590 to a processor 555 which controls the phases $\Phi$ of each of the phase shifters 510A-510D, 515A-515D and 528, (i.e., phases $\Phi 1$-$\Phi 9$). An azimuth phase detector 560 provides phase information 575 to the transceiver 550 based on selected output modes 505 sampled by directional couplers 565 and 570, (e.g., mode 0 and mode +1 provided by the azimuth board 305A, as shown in FIG. 5). Alternatively, directional couplers 565 and 570 may be power dividers or any other known signal sampling device. An elevation amplitude detector 580 provides amplitude information 584 to the transceiver 550 based on the elevation sum-mode 535 and the elevation difference-mode 540 sampled by a directional coupler 545. Alternatively, the directional coupler 545 may be a power divider or any other known signal sampling device.

The directional coupler 545 acts as a radio frequency (RF) interface for the transceiver 550 when the transceiver 550 forms beams used to receive and transmit an RF signal 582. The baseband signal 590 is generated by the transceiver 550 based on the RF signal 582, the phase information 575 and the amplitude information 584. The processor 555 calculates azimuth DOA and controls the phase shifters 510A-510D, 515A-515D and 528 via phase control signal 592 based on the baseband signal 590. The processor 555 may optionally provide a modulation signal 594 to the transceiver 550 used for generating the RF signal 582. When the RF signal 582 is formed by the transceiver 550, the RF signal 582 is routed through the directional coupler 545, the sum-mode port of the Butler matrix 530, the elevation phase shifter 528, the combined ports of the combiners 520 and 525, and the azimuth phase shifters 510A, 510B, 510C, 510D, 515A, 515B, 515C and 515D, to feed the 2-tier stacked Shelton-Butler matrix and, in turn, form at least one beam by using the antenna elements A1-A8.

The transceiver 550 forms beams for both azimuth and elevation using the 2-tier stacked Shelton-Butler matrix. For elevation DOA, amplitude comparison is used. A complete elevation and azimuth direction finding system is implemented by sharing a received single bit or pulse included in each incoming signal. The bit or pulse contains both amplitude and phase information which is processed such that the amplitude information is used for determining elevation, and the phase information is used for determining azimuth.

It is important to note that an antenna does not, by itself, detect distance. Thus, a spherical coordinate system must be devised, (r, ø, θ), whereby the antenna uses only angles ø and θ. The distance may be detected based on the measurement of time or phase parameters, or triangulation techniques.

As illustrated in FIG. 5, the Butler matrix 530 forms a respective sum-mode 535 and a difference-mode 540 associated with a particular mode, (i.e., mode 0, mode 2, mode +1 and mode −1). The ratio of the sum-mode over the difference-mode is determined by the transceiver 550 and the processor 555 to determine the angle away from the boresight.

For example, the broadside array factor and elemental elevation pattern product may be calculated to derive a sum pattern equation and a difference pattern equation. The ratio of these two equations as a function of elevation angle θ may be used to determine DOA and calibrating the antenna system 500.

The same principles described above are applied to form a beam in the direction of the arriving signal. Insertion of a phase shift in the sum-and-difference matrix steers the sum-mode beam to the elevation boresight. However, the beam shape in azimuth is still omni-directional. To form a directive beam in azimuth, all of the modes in azimuth have to be aligned. This requires a power divider at the output, and phase shifters in the divided branches. The azimuth beam may be synthesized using a fast Fourier transform (FFT). The phase shifters are used to form a beam in a desired direction It should be obvious to one of ordinary skill in the art that the enhancements provided by the present invention may lead to more accurate knowledge of the correct direction of the boresight of transmit and receive beams from one or both ends of a communication link. This allows for the narrowing of the beam width in both azimuth and/or elevation. Thus, the present invention facilitates a more robust link, lower power consumption, less received interference, and less induced interference to other devices not involved in this link.

The implementation of the present invention also provides enhanced techniques for locating one or more devices. The angles of the beam(s) resolve the location of the device(s) in three dimensions, rather than just two dimensions as implemented by conventional wireless communication systems. The resolution in three dimensions further allows the narrowing of the beam for diversity purposes. This narrowing further improves the resolution of the angle in each plane of interest.

Figure 6:
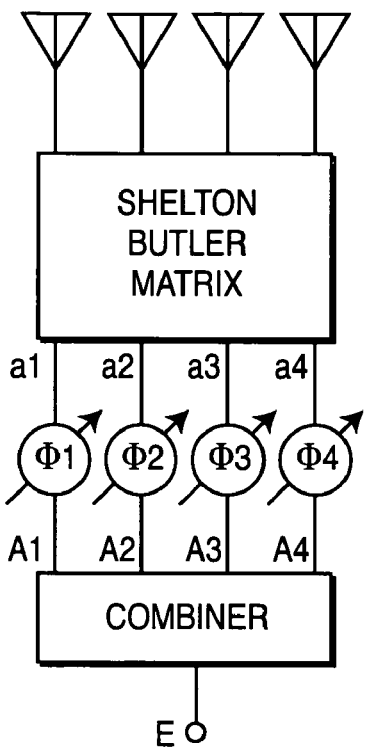
FIG. 6 shows an exemplary beamforming and pointing antenna system.

FIG. 6 illustrates an exemplary beam formation and pointing antenna system including mode ports a1, a2, a3 and a4 and phase shifters with phases $\Phi 1$, $\Phi 2$, $\Phi 3$ and $\Phi 4$ which form respective complex voltages A1, A2, A3 and A4 before entering a combiner, which outputs a complex voltage E or E(ø), which is a function of azimuth angle ø, and is also referred to herein as the beam pattern of the array.

The normalized azimuth field pattern of the antenna array of the system can be written in terms of the matrix mode inputs as denoted by Equation (1) below:

$$E(\phi) = \frac{\sum_{n=-1}^{2} A_n e^{jn\phi}}{\sum_{n=-1}^{2} |A_n|}; \qquad \text{Equation (1)}$$

where n is the mode number and $A_n$ is the complex mode excitation current. Because the modes of the matrix form an orthogonal set, the far-field beam of the array can be easily synthesized and steered. The synthesis is not complex because the expression is a fast Fourier series, the inverse of which provides the antenna system with necessary information it needs about the phases $\Phi_n$ used to form the beam in the required direction.

Figure 7:
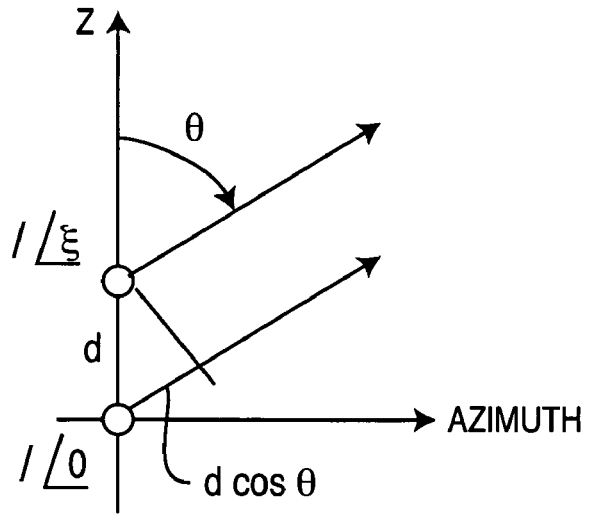
FIG. 7 shows a graphical representation of the stacked circular array in the exemplary antenna system of FIG. 5.

As shown in FIG. 7, the stacked circular arrays can be represented by two point sources to compute the elevation sum and difference patterns. Since the two arrays are identical, a beam pattern multiplication technique can be used to determine a final elevation beam pattern, where d is the vertical distance of separation of the phase center of two circular arrays, theta θ is the depression angle, and ξ is the phase difference between the two arrays.

The expression for the sum beam is denoted by Equation (2) below:

$$F_s(\theta)H(\theta) = \frac{1}{2} \times \frac{\sin\left(\frac{2\pi d}{\lambda}\cos\theta\right)}{\sin\left(\frac{\pi d}{\lambda}\cos\theta\right)} H(\theta); \quad \text{Equation (2)}$$

where λ is the wavelength, $F_s(\theta)$ is the array factor from elevation sum, and $H(\theta)$ is the pattern in elevation from the circular array.

The expression for the difference beam is denoted by Equation (3) below:

$$F_d(\theta)H(\theta) = \frac{1}{2} \times \frac{\sin\left(\frac{2\pi d}{\lambda}\cos\theta + \pi\right)}{\sin\left(\frac{\pi d}{\lambda}\cos\theta + \frac{\pi}{2}\right)} H(\theta); \quad \text{Equation (3)}$$

where $F_d(\theta)$ is the array factor associated with an elevation difference.

Figure 8:
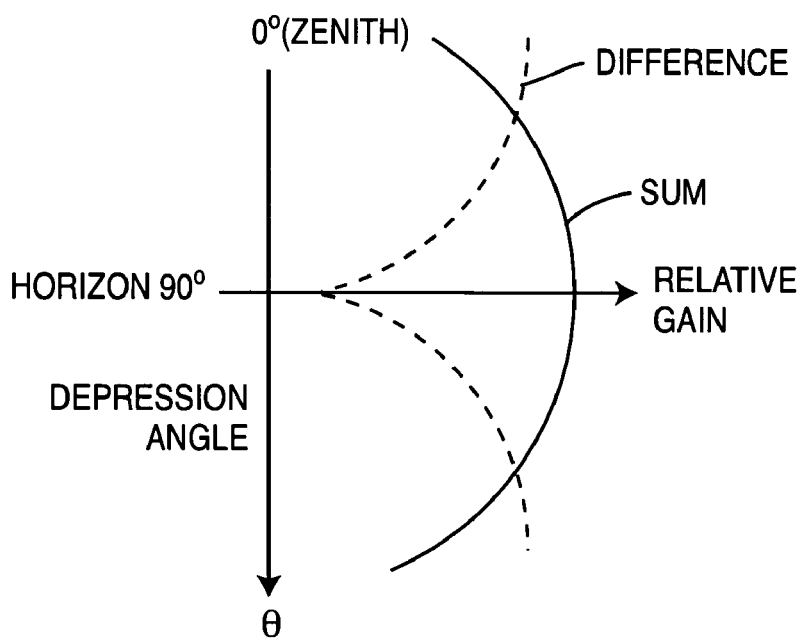
FIG. 8 illustrates how elevation beams are formed in accordance with the present invention.

FIG. 8 illustrates how elevation sum and difference beam patterns are formed, where the sum beam is generally higher than the difference beam. Each of the four azimuth modes 0, 2, +1 and −1 has a sum and difference relationship in elevation as depicted in FIG. 8. Only two of the four modes are needed, (e.g., modes 0 and +1). The beam width is a function of the antenna array stack spacing d. The smaller the spacing d, the broader the sum and difference beam patterns become.

A 2-stack elevation matrix may simply consist of a hybrid and a fixed phase-shifter, or an unequal line length. The DOA in elevation is a function of amplitude ratio of sum over difference. Any existing ambiguity is resolved by checking the phases of sum and difference, whether they are in-phase or out-of-phase. A calibration plot often resolves the difference between theory and practice. A small amount of signal can be tapped off from the required modes, (e.g., modes 0 and +1), using high directivity directional couplers, to determine DOA in elevation.

After the DOA is determined by using the amplitude ratio of sum over difference, or from a calibration data map, the angle of the sum beam is tilted by the angle θ, where ξ is solved using Equation (4) as denoted below:

$$F(\theta)H(\theta) = \frac{1}{2} \times \frac{\sin\left(\frac{2\pi d}{\lambda}\cos\theta + \xi\right)}{\sin\left(\frac{\pi d}{\lambda}\cos\theta + \frac{\xi}{2}\right)} H(\theta); \quad \text{Equation (4)}$$

where angle θ is now the known DOA. Once the array phase difference ξ is determined, the beam may be accurately pointed in the direction of a received signal for which angle θ has been determined. Without this information, the information needed to accurately point the beam is not complete.

Although the features and elements of the present invention are described in the preferred embodiments in particular combinations, each feature or element can be used alone without the other features and elements of the preferred embodiments or in various combinations with or without other features and elements of the present invention.

While the present invention has been described in terms of the preferred embodiment, other variations which are within the scope of the invention as outlined in the claims below will be apparent to those skilled in the art.

What is claimed is:

1. A wireless communication apparatus for determining the direction of arrival (DOA) of received signals in elevation, and forming beams in the determined direction, the apparatus comprising:
   two antenna arrays, each of the antenna arrays including a plurality of antenna elements;
   a first azimuth matrix board coupled to a first one of the antenna arrays;
   a second azimuth matrix board coupled to a second one of the antenna arrays;
   a first set of azimuth phase shifters;
   a second set of azimuth phase shifters;
   a first combiner having a plurality of input ports coupled to respective mode ports of the first azimuth matrix board via respective ones of the first set of azimuth phase shifters;
   a second combiner having a plurality of input ports coupled to respective mode ports of the second azimuth matrix board via respective ones of the second set of azimuth phase shifters;
   an electronic elevation phase shifter coupled to an output of the second combiner; and
   a Butler matrix coupled to an output of the first combiner and an output of the electronic elevation phase shifter, the Butler matrix configured to form an elevation sum-mode and an elevation difference-mode such that DOA of the received signals can be determined in elevation, and beams can be formed in the direction of the received signals.

2. The apparatus of claim 1 further comprising:
   a transceiver in communication with the Butler matrix, wherein:
      the apparatus forms a plurality of orthogonal omni-directional modes,
      each of the modes has a characteristic phase set, and
      two of the modes' phases are used to determine DOA in azimuth.

3. The apparatus of claim 1 wherein the antenna arrays are identical circular arrays spaced apart by a distance d which defines the width of at least one pair of elevation beams formed by at least one of the first and second azimuth matrix boards.

4. The apparatus of claim 2 further comprising:
   an azimuth phase detector for detecting the azimuth phase of two of the orthogonal omni-directional modes.

5. The apparatus of claim 2 wherein the orthogonal omni-directional modes include mode 0, mode 2, mode +1 and mode −1.

6. The apparatus of claim 1 further comprising:
   an elevation amplitude detector, wherein DOA is determined by dividing the elevation sum-mode by the elevation difference-mode.

7. The apparatus of claim 3 wherein the distance d is adjusted to change the width of the at least one pair of elevation beams.

8. The apparatus of claim 3 wherein a beam pattern multiplication technique is used to determine a final elevation beam pattern, where d is the vertical distance of separation of the phase center of the two antenna arrays, θ is the depression angle, and ξ is the phase difference between the two antenna arrays.

9. The apparatus of claim 8 wherein a sum beam is formed by the apparatus as a function of the following equation:

$$F_s(\theta)H(\theta) = \frac{1}{2} \times \frac{\mathrm{Sin}\left(\frac{2\pi d}{\lambda}\cos\theta\right)}{\mathrm{Sin}\left(\frac{\pi d}{\lambda}\cos\theta\right)} H(\theta),$$

where λ is the wavelength, $F_s(\theta)$ is the array factor derived from the elevation sum-mode, and H(θ) is the elevation pattern of one of the two identical circular arrays.

10. The apparatus of claim 8 wherein a difference beam is formed by the apparatus as a function of the following equation:

$$F_d(\theta)H(\theta) = \frac{1}{2} \times \frac{\mathrm{Sin}\left(\frac{2\pi d}{\lambda}\cos\theta + \pi\right)}{\mathrm{Sin}\left(\frac{\pi d}{\lambda}\cos\theta + \frac{\pi}{2}\right)} H(\theta),$$

where λ is the wavelength, $F_d(\theta)$ is the array factor derived from the elevation difference-mode, and H(θ) is the elevation pattern of one of the two identical circular arrays.

11. The apparatus of claim 9 wherein the sum beam is tilted by the angle θ to solve for ξ, where $$F(\theta)H(\theta) = \frac{1}{2} \times \frac{\mathrm{Sin}\left(\frac{2\pi d}{\lambda}\cos\theta + \xi\right)}{\mathrm{Sin}\left(\frac{\pi d}{\lambda}\cos\theta + \frac{\xi}{2}\right)} H(\theta)$$

where θ is the known DOA.

12. The apparatus of claim 1 wherein each of the antenna arrays has four antenna elements.

13. The apparatus of claim 1 wherein the Butler matrix is a two-port Butler matrix.

14. The apparatus of claim 1 wherein the received signals include bits or pulses containing both amplitude and phase information, and the amplitude information is used for determining elevation and the phase information is used for determining azimuth.

15. The apparatus of claim 1 wherein the apparatus forms transmit and receive beams that steer in both azimuth and elevation.

16. The apparatus of claim 1 wherein the apparatus forms a single beam for transmitting and receiving signals from a source, wherein the beam has independent elevation and azimuth values.

17. The apparatus of claim 1 wherein the apparatus forms beams for reception of signals.

18. A wireless communication apparatus for determining the direction of arrival (DOA) of received signals in elevation, and forming beams in the determined direction, the apparatus comprising:
  two antenna arrays, each of the antenna arrays including a plurality of antenna elements;
  a first azimuth matrix board coupled to a first one of the antenna arrays;
  a second azimuth matrix board coupled to a second one of the antenna arrays; and
  a Butler matrix coupled to an output of the first combiner and an output of the electronic elevation phase shifter, the Butler matrix configured to form an elevation sum-mode and an elevation difference-mode such that DOA of the received signals can be determined in elevation, and beams can be formed in the direction of the received signals, wherein the antenna arrays are identical circular arrays spaced apart by a distance d which defines the width of at least one pair of elevation beams formed by at least one of the first and second azimuth matrix boards, a beam pattern multiplication technique is used to determine a final elevation beam pattern, where d is the vertical distance of separation of the phase center of the two antenna arrays, θ is the depression angle, and ξ is the phase difference between the two antenna arrays, and a sum beam is formed by the apparatus as a function of the following equation:

$$F_s(\theta)H(\theta) = \frac{1}{2} \times \frac{\mathrm{Sin}\left(\frac{2\pi d}{\lambda}\cos\theta\right)}{\mathrm{Sin}\left(\frac{\pi d}{\lambda}\cos\theta\right)} H(\theta),$$

where λ is the wavelength, $F_s(\theta)$ is the array factor derived from the elevation sum-mode, and H(θ) is the elevation pattern of one of the two identical circular arrays.

19. The apparatus of claim 18 wherein the sum beam is tilted by the angle θ to solve for ξ, where $$F_d(\theta)H(\theta) = \frac{1}{2} \times \frac{\mathrm{Sin}\left(\frac{2\pi d}{\lambda}\cos\theta + \pi\right)}{\mathrm{Sin}\left(\frac{\pi d}{\lambda}\cos\theta + \frac{\pi}{2}\right)} H(\theta),$$

where θ is the known DOA.

20. The apparatus of claim 18 wherein the distance d is adjusted to change the width of the at least one pair of elevation beams.

21. The apparatus of claim 18 wherein the received signals include bits or pulses containing both amplitude and phase information, and the amplitude information is used for determining elevation and the phase information is used for determining azimuth.

22. The apparatus of claim 18 wherein the apparatus forms transmit and receive beams that steer in both azimuth and elevation.

23. The apparatus of claim 18 wherein the apparatus forms a single beam for transmitting and receiving signals from a source, wherein the beam has independent elevation and azimuth values.

24. The apparatus of claim 18 wherein the apparatus forms beams for reception of signals.

25. A wireless communication apparatus for determining the direction of arrival (DOA) of received signals in elevation, and forming beams in the determined direction, the apparatus comprising:
  two antenna arrays, each of the antenna arrays including a plurality of antenna elements;
  a first azimuth matrix board coupled to a first one of the antenna arrays;
  a second azimuth matrix board coupled to a second one of the antenna arrays; and a Butler matrix coupled to an output of the first combiner and an output of the electronic elevation phase shifter, the Butler matrix configured to form an elevation sum-mode and an elevation difference-mode such that DOA of the received signals can be determined in elevation, and beams can be formed in the direction of the received signals, wherein the antenna arrays are identical circular arrays spaced apart by a distance d which defines the width of at least one pair of elevation beams formed by at least one of the first and second azimuth matrix boards, a beam pattern multiplication technique is used to determine a final elevation beam pattern, where d is the vertical distance of separation of the phase center of the two antenna arrays, $\theta$ is the depression angle, and $\xi$ is the phase difference between the two antenna arrays, and a difference beam is formed by the apparatus as a function of the following equation:

$$F_d(\theta)H(\theta) = \frac{1}{2} \times \frac{\operatorname{Sin}\left(\frac{2\pi d}{\lambda}\cos\theta + \pi\right)}{\operatorname{Sin}\left(\frac{\pi d}{\lambda}\cos\theta + \frac{\pi}{2}\right)} H(\theta),$$

where $\lambda$ is the wavelength, $F_d(\theta)$ is the array factor derived from the elevation difference-mode, and $H(\theta)$ is the elevation pattern of one of the two identical circular arrays.

26. The apparatus of claim 25 wherein the distance d is adjusted to change the width of the at least one pair of elevation beams.

27. The apparatus of claim 25 wherein the received signals include bits or pulses containing both amplitude and phase information, and the amplitude information is used for determining elevation and the phase information is used for determining azimuth.

28. The apparatus of claim 25 wherein the apparatus forms transmit and receive beams that steer in both azimuth and elevation.

29. The apparatus of claim 25 wherein the apparatus forms a single beam for transmitting and receiving signals from a source, wherein the beam has independent elevation and azimuth values.

30. The apparatus of claim 25 wherein the apparatus forms beams for reception of signals.

* * * * *